(12) United States Patent
Kroupa

(10) Patent No.: US 8,600,461 B2
(45) Date of Patent: Dec. 3, 2013

(54) ATTACHABLE EXTENDABLE AND RETRACTABLE EARPIECE ASSEMBLY FOR MOBILE COMMUNICATION AND SOUND DEVICES

(76) Inventor: Robert Kroupa, Chicago, IL (US)

( * ) Notice: Subject to any disclaimer, the term of this patent is extended or adjusted under 35 U.S.C. 154(b) by 474 days.

(21) Appl. No.: 12/629,220

(22) Filed: Dec. 2, 2009

(65) Prior Publication Data

US 2011/0130174 A1 Jun. 2, 2011

(51) Int. Cl.
*H04M 1/00* (2006.01)
*H04W 88/02* (2009.01)

(52) U.S. Cl.
USPC ............... 455/575.6; 455/90.3; 455/575.1; 455/575.2

(58) Field of Classification Search
USPC ............ 455/90.3, 569.1, 575.1, 575.2, 575.6, 455/557; 379/430
See application file for complete search history.

(56) References Cited

U.S. PATENT DOCUMENTS

| | | | |
|---|---|---|---|
| 6,633,770 B1 | 10/2003 | Gitzinger et al. | |
| 6,763,111 B2 | 7/2004 | Liao | |
| 7,032,728 B2 * | 4/2006 | Harcourt | 191/12.2 R |
| 7,151,912 B1 * | 12/2006 | Morrison | 455/90.3 |
| 2001/0035242 A1 * | 11/2001 | Hughs et al. | 150/154 |
| 2003/0165237 A1 * | 9/2003 | Farr et al. | 379/430 |
| 2004/0256188 A1 * | 12/2004 | Harcourt | 191/12.2 A |
| 2005/0116684 A1 | 6/2005 | Kim | |
| 2005/0255898 A1 | 11/2005 | Huang | |
| 2007/0293288 A1 | 12/2007 | Lin et al. | |

* cited by examiner

*Primary Examiner* — John J Lee
(74) *Attorney, Agent, or Firm* — Howard B. Rockman

(57) ABSTRACT

An extendable and retractable earpiece cable assembly for mobile communication or sound devices comprising a plate adapted to be fastened directly to the mobile device. The plate supports a reel housing that includes a reel mechanism around which the earpiece cables are removably wound. The earpiece cables are extendable from and retractable into the reel housing. Each of the earpiece cables have one end attached to an earpiece and each of the earpiece cables have a second end attached to a jack plug to electrically connect the earpieces to the mobile device. The plate also supports an attachment clip that allows a user to attach the mobile communication or sound device and integral earpiece assembly to an article of clothing or other accessory item supported by a user. In other embodiments, a rear back plate is fixed to the mobile device, and a front plate is removably attached to the rear plate. The cable reel assembly housing and the attachment clip are attached to the front plate.

12 Claims, 4 Drawing Sheets

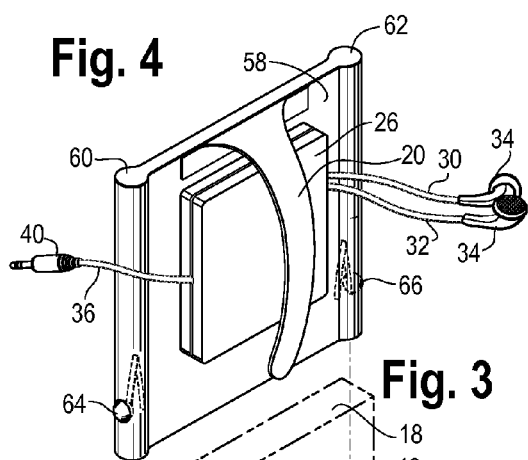
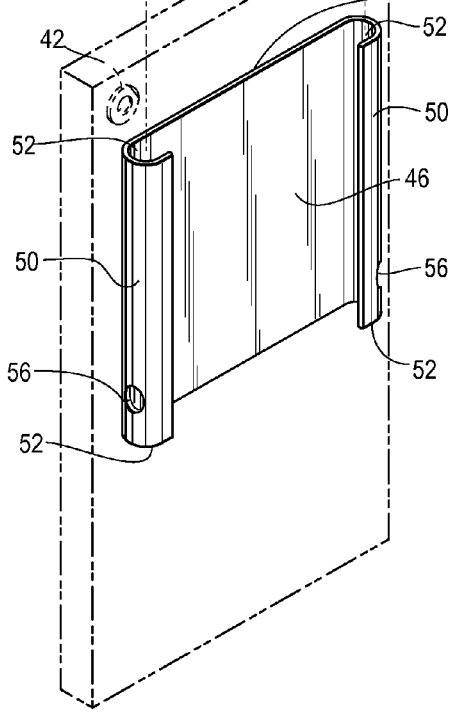
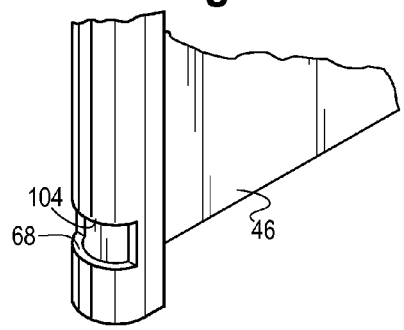
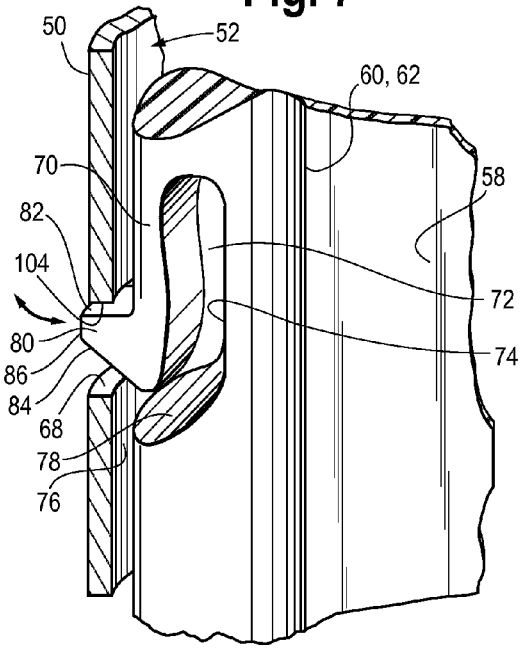
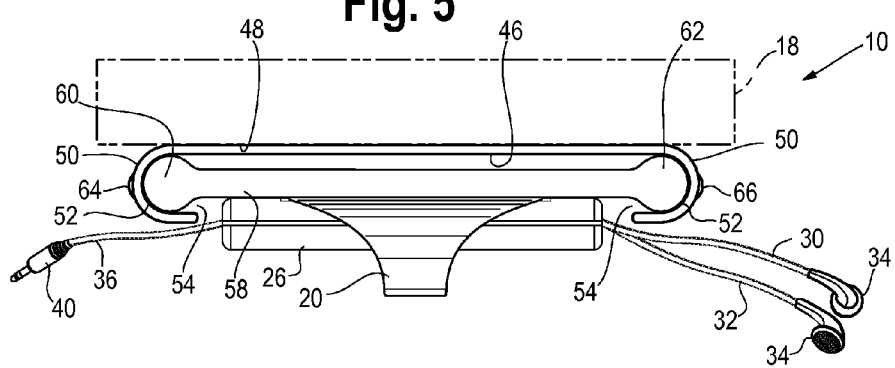

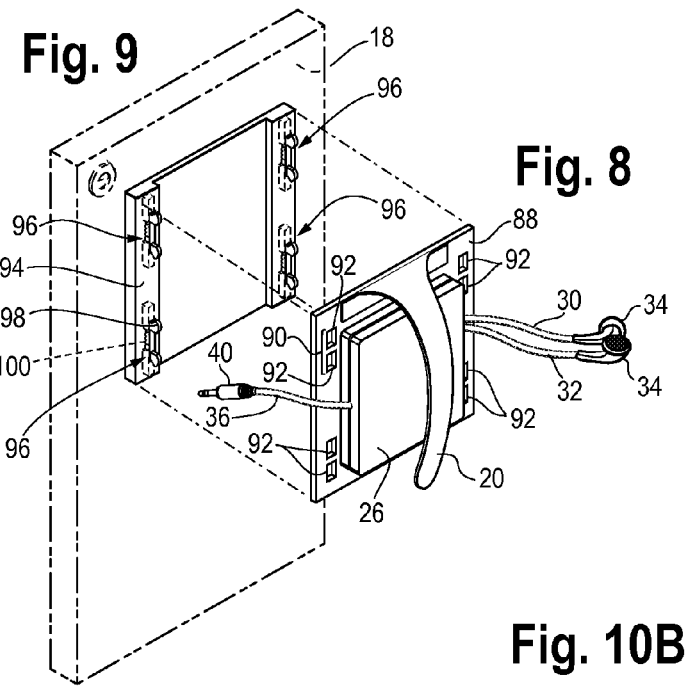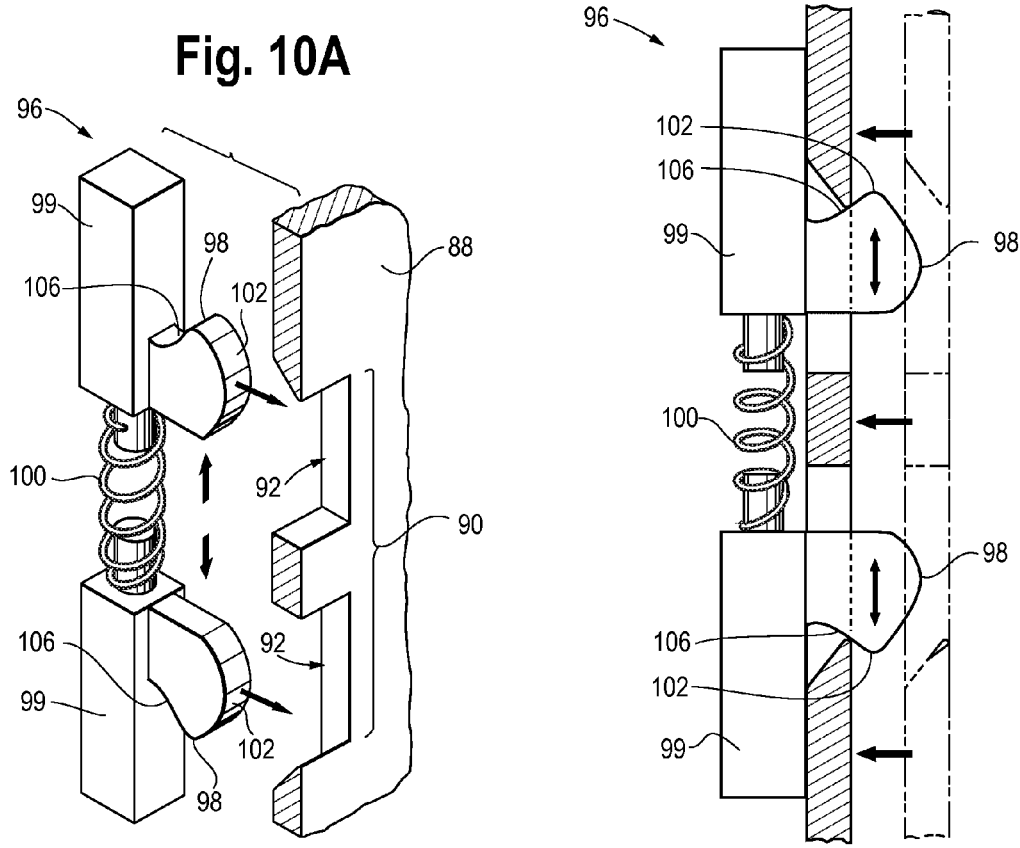

ATTACHABLE EXTENDABLE AND RETRACTABLE EARPIECE ASSEMBLY FOR MOBILE COMMUNICATION AND SOUND DEVICES

BACKGROUND OF THE INVENTION

1. Field of the Invention

The present invention relates generally to extendable and retractable earpieces for mobile sound and communication devices, and more particularly to an extendable and retractable earpiece assembly permanently attached directly to the mobile device in one embodiment, and removably attached directly to the mobile device in other embodiments.

2. Description of the State of the Art

Portable sound and communication devices deliver sound waves through either a built in speaker unit or a pair of earpieces adapted to be electrically connected to and removed from the device. While a speaker is a practical feature for a portable communication device, portable sound systems designed to deliver a user's musical selections over a period of time generally require connection of a headset earpieces, or earpieces per se, to the portable device to convey the sound to the user in private, and without disturbing those nearby the user. Also, many portable communication devices that have a built-in speaker system also have a socket for receiving an earpiece connection jack.

Currently, most if not all portable sound devices, and many portable communication devices, are used with headsets or earpieces. For example, portable communication device users rely on headsets or earpieces for convenience in multi-tasking. Such headsets and earpieces, and associated wires, however, when not in use, extend and dangle from the mobile device, allowing the wires, headset and/or earpieces to become ensnared on a nearby object, such as the user's clothing, and to rip out of the device causing damage to the headset or earpieces and wires, or both. Replacement of such damaged parts can be costly.

Additionally, most users of portable sound and communication devices are required to carry at least three separate pieces: a carrying case, a headset or earpieces, and the sound or communication device. Locating and carrying three separate pieces is often frustrating and time consuming. Additionally, certain scientific studies have suggested that the extended use of cell phone or blue tooth wireless headset devices, when the cell phone or blue tooth wireless headset device is placed directly adjacent to one's ear can result in undesirable health problems, such as tumors and cancer, not the least of which is known as cell phone elbow with cell phones. Some users of blue tooth wireless headset devices or cell phones in close proximity to the ear have also reported increased headaches.

Presently available recharging units and carrying cases for portable sound and communication devices include assemblies to hold earpiece cables around a spool attached to the carrying case or recharging unit. See, for example, U.S. Patent Publications No. 2005/0116684; 2005/0255898; and 2007/0293288. The prior art also includes stand alone headset cable reel assemblies that attach to the cable itself. These devices add yet another separate component for a user of a portable sound or communication device to deal with. For example, see Patent Publication No. 2001/0035242.

None of the aforesaid prior devices provide a combined integral extendable and retractable earpiece cable reel assembly that attaches directly to a portable sound or communication device, or that can be removably attached directly to a portable sound or communication device.

SUMMARY OF THE INVENTION

The present invention provides, in one embodiment, a carrying clip allowing a user to attach a mobile sound or communication device such as a cell phone, sound pod, PDA, pager, etc. to the user's belt, pocket, handbag, backpack or other personally worn or carried item. The carrying clip includes a housing portion in which is located extendable and retractable earpieces. Each earpiece is attached to an earpiece cable that is electrically connected to the earpiece at one end, and to a jack plug at an opposite end. The jack plug is designed to be inserted into the outlet portal of the mobile device. The carrying clip in one embodiment has a semi-permanent adhesive on one surface of a plate, with the adhesive removably attaching the plate to the rear of the mobile device. This embodiment of the invention eliminates carrying three separate items: the cell phone or sound pod, carrying case, and headset or earpieces. The housing for the retractable earpiece cables could be permanently fixed to the plate, or could be removably attached to the plate.

The clip assembly may also include a separate small adhesive-backed hook-and-loop fastening device to attach the clip to the dashboard of a car, or to another solid surface.

Additional embodiments of the present invention provide a rear plate adapted to be fixedly attached to the rear of the mobile communication or sound device, and a forward plate assembly that is removably attached to the rear plate. The forward plate assembly includes a cable reel assembly into which the earpiece cables are retracted when the mobile device is not in use. The removable forward plate assembly allows the mobile communication or sound device to be installed in a docking station without interference from the forward plate and cable reel assembly.

BRIEF DESCRIPTION OF THE DRAWINGS

The following figures are included to better illustrate the embodiments of the devices and techniques of the present invention. In these figures, like numerals represent like features in the several views. It is to be noted that in these figures, illustrating the several views of the present invention, unless stated to be otherwise, are not necessarily drawn to scale. Nor are the contents of the drawings to be considered as limiting the scope of the present invention as defined in the claims.

FIG. 3 is a perspective view of the rear plate of a further embodiment of the invention, shown attached to the rear of a portable sound or communication device;

FIG. 4 is a perspective view of the front plate assembly of the embodiment of the invention illustrated in FIG. 3 with the lines extending between FIGS. 3 and 4 illustrating how the front plate assembly is connected to the rear plate;

FIG. 5 is a top view of the front plate assembly of FIG. 4 shown removably attached to the rear plate shown in FIG. 3, with the rear plate shown attached to the mobile sound or communication device;

FIG. 6 is a detail view of a portion of the rear plate shown in FIG. 3, illustrating an alternate embodiment of the invention where a portion of the tubular attachment member includes an aperture to receive a locking hinge of the front plate assembly;

FIG. 7 is a detail view of the embodiment of the invention shown in FIG. 6 where a portion of the front plate assembly includes a locking hinge adapted to be received in the aperture of FIG. 6 when the front plate assembly is attached to the rear plate assembly;

FIG. 8 is an elevation view of a further embodiment of the front plate assembly shown in FIGS. 4 and 5;

FIG. 9 is an elevational view of rear plate of FIG. 3, wherein spring locking mechanisms are included to removably attach the rear plate to the front plate in the embodiment of the invention shown in FIG. 8 with lines extending between FIGS. 8 and 9 illustrating how the front plate assembly is attached to the rear plate;

FIG. 10A is a perspective detail view of the spring locking mechanism and front plate shown in FIGS. 8 and 9;

FIG. 10B is a sectional view showing the spring locking mechanism and front plate assembly of FIGS. 8 and 9 shown in the engaged position;

DETAILED DESCRIPTION OF THE ILLUSTRATED EMBODIMENTS

The present invention, in one embodiment, provides a retractable headset or earpiece cable assembly mounted on a plate. The plate is attached directly to the rear of a mobile communications or sound device, and the cable assembly is extendable from and retractable into a reel housing mounted on the plate. A clip assembly is also mounted on the plate for attaching the plate and mobile device to the belt, pocket, backpack or strap worn or supported by the user. The invention allows a user to carry only a single item that includes the mobile communication or sound device, retractable headset or earpiece and cables, and clip-on assembly in lieu of transporting several pieces to achieve the same results provided by the present invention. The user benefits from the convenience and ease of transporting and using his or her mobile communication or sound device, and having an integral clip-on unit and cable reel assembly mounted directly on the mobile device to prevent the cables from becoming tangled or hanging loose when the portable device is not being used.

Figure 1:
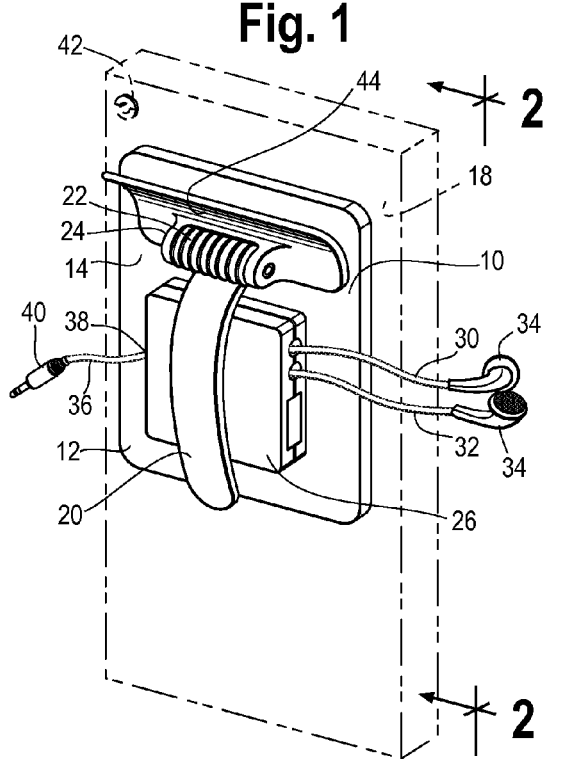
FIG. 1 is a front perspective view of an embodiment of the invention wherein the carrying clip extendable and retractable earpiece cable assembly and reel housing is attached to a plate, wherein the plate is attached to a mobile communication or sound device.
Figure 2:
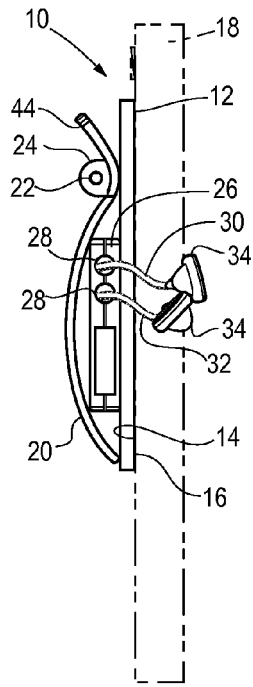
FIG. 2 is a side view of the plate, cable assembly and reel housing, and carrying clip of the embodiment of the present invention, shown in FIG. 1, taken along line 2-2 of FIG. 1.

Referring to the embodiment of FIGS. 1 and 2, the extendable and retractable earpiece cable and attachment clip assembly of the present invention is generally designated by the numeral 10. The assembly 10 comprises a relatively thin flat plate 12 having forward and back surfaces 14, 16 respectively. As seen in FIG. 1, back surface 14 of plate 12 is adapted to be fixed directly to the rear of mobile sound or communication device 18 by means of adhesive, hook and loop fasteners, or other attachment means as are known in the art.

If the mobile device 18 is of the type that is impermeable to, or its operation is not affected by, magnetic waves, the assembly 10 could be magnetically attached to the dash of a vehicle for storage when not in use. In this embodiment (not shown) a separate permanent magnet is attached to the dash that would attract and secure the metal of clip 20 to the dash. In another embodiment (not shown), where a hollow cable reel assembly housing 26, described below, is located on the forward surface 14 of plate 12 (FIGS. 1, 2) and the clip 20 extends around the sides of housing 26, then housing 26 can be attached directly to the permanent magnet on the vehicle dash when the device 10 is not in use.

An attachment clip 20 is pivotally attached to forwarded surface 14 of plate 12 by pivot pins 22 extending through a pair of brackets 24. Brackets 24 are each attached to or integral with the forward surface 14 of plate 12. Clip 20 is biased to the closed position against forward surface 14 by means of a coil spring assembly, not shown. As will be explained, attachment clip 20 is adapted to removably engage a belt, strap or other item worn by a user of mobile device 18.

The hollow cable reel assembly housing 26 is formed on or attached to forward surface 14 of plate 12. A retractable and extendable cable reel assembly is located inside reel housing 26. As seen in FIG. 2, reel housing 26 includes at least one aperture 28 through which earpiece cables 30, 32 extend. Each cable 30, 32 is electrically connected to an earpiece 34, as seen in FIGS. 1 and 2. Cables 30, 32 are attached at their respective ends opposite earpieces 34 to a retractable and extendable reel mechanism inside reel housing 26, that allows cables 30, 32 to be manually extended from housing 26 as the user places earpieces 34 in his or her ears.

Figure 2A:
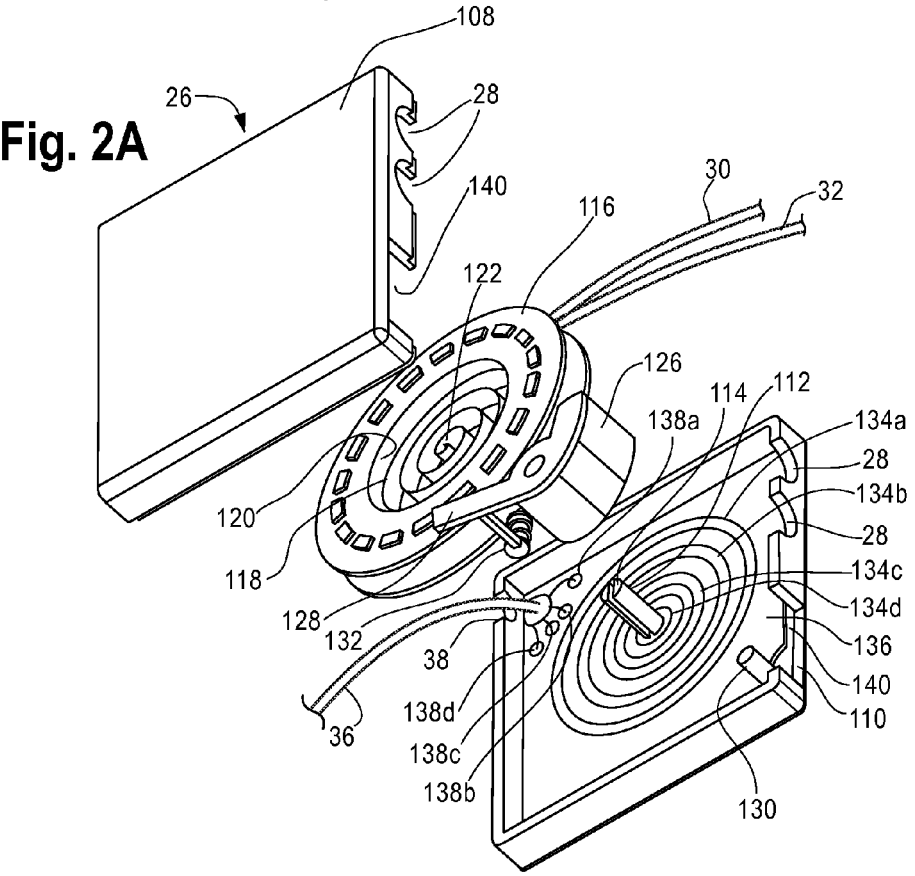
FIG. 2A is an exploded view of the reel housing of FIGS. 1 and 2, illustrating a typical extendable and retractable cable reel in the housing.

Referring to FIG. 2A, reel housing 26 includes a top part 108 that mates with bottom part 110 to form hollow reel housing 26. A shaft 112 is attached to and extends outward from bottom part 110, and a slit 114 is formed in the upper portion of shaft 112. A cable reel 116 is located in reel housing 26, and a coil plate spring 118 is located in an open circular wall portion 120 of reel 116. When reel 116 is assembled in reel housing 26, an end 122 of spring 118 fits into slit 114 of shaft 112, holding one end of spring 118 against rotation. The other end of spring 118 is firmly attached to wall portion 120 of reel 116.

Reel 116 includes a plurality of angled ratchet teeth 124 mounted on a rim of the reel. A release button 126 has a stopper and release arm 128, and the release button 126 is pivotally mounted to a shaft 130 attached to bottom part 110 of reel housing 26. The underside of outer end of stopper and release arm 128 includes a stop member (not shown) that is adapted to engage ratchet teeth 124 and allow rotation of cable reel 116 in the clockwise direction only as viewed in FIG. 2A. When release button 126 is pivoted, and arm 128 is moved away from engagement with ratchet teeth 124, spring 118 will rotate reel 116 in a counter-clockwise direction, as will be explained. A small spring 132 engages a side wall of reel housing 26, and biases stopper and release arm 128 into engagement with ratchet teeth 124.

In the embodiment illustrated in FIG. 2A, a plurality of concentric conductive rings 134a, b, c, d are located on the interior of bottom part 110 of reel housing 26. A printed circuit board 136 is positioned next to bottom part 110, and includes a plurality of concentric conductive rings 134a-d. Each of the conductive rings 134a-d are electrically connected to cable 36 and jack plug 40 (FIG. 1) by solder points 138a-d (FIG. 2A). In the illustrated embodiment, four spring wiper contacts (not shown) are attached to reel 116 and are aligned such that when reel 116 rotates, the spring wiper contacts remain in constant contact with a corresponding conductive ring 134a-d. The four wires in both earpiece cables 30, 32, are each connected to one of the spring wiper contacts on reel 116. Release button 126 extends through an opening 140 in reel housing 26, making release button 126 accessible to a user.

When a user desires to extract earpiece cables 30, 32 from reel housing 26, the user pulls on earpieces 34 (FIG. 1) using a slight tension force. The stop member (not shown) on the underside of stopper and release arm 128 glides over ratchet teeth 124 as reel 116 rotates without engaging the ratchet teeth. Simultaneously, spring 118 is wound, thus storing kinetic energy. When a sufficient length of earpiece cable 30, 32 has been extracted from reel housing 26, tension on the cables is released, and the stop member engages one of the ratchet teeth 124, preventing reverse rotation of cable reel 116. Reel 116 can be fixed at any point on the rotation of reel 116, allowing the user to extract any suitable length of earpiece cable 30, 32 and have the earpiece cable fixed at that extracted length until release button 126 is pushed inward.

When the user desires to retract earpiece cables 30, 32 into reel housing 26, finger pressure is applied to release button 126, which pivots stopper and release arm 128 out of engagement with the ratchet teeth 124. The kinetic energy stored in spring 118 is released, rotating reel 116 in an opposite direction, thus rewinding cable wires 30, 32 onto reel 116. At all times during the extraction or retraction of earpiece cables 30, 32 relative to reel housing 26, the earpieces 34 remain electrically connected to solder points 138a-d and to cable jack plug 40 (FIG. 1). Cables 30, 32 are prevented from being retracted fully inside of reel housing 26 since the outer diameters of earpieces 34 at the point where they attach to cables 30, 32, respectively, are larger than the inner diameters of apertures 28.

The concentric ring-spring wiper contact, spring operated reel and lock-release designs illustrated in FIG. 2A and described above are well known in the field of electrical and mechanical design. However, the described retractable earpiece cable structure has not been used previously in a retractable and releasable earpiece cable assembly that is attached directly to, or removably attached directly to, a mobile communication or sound device.

The ends of cables 30, 32 opposite earpieces 34 as described above, are electrically connected through solder points 138a-d to a cable 36 extending from an aperture 38 in reel housing 26. The terminus end of cable 36 includes a jack plug 40 that is adapted to be inserted into the sound output portal 42 of the mobile device 18. For convenience, the cable 36 may be a self-coiling cable that is extended when plug 40 is inserted into portal 42.

To operate the retractable earpiece cable assembly 10 illustrated in FIGS. 1 and 2, a user first attaches the back surface 16 of plate 12 to the rear of mobile device 18 with an adhesive, semi-permanent adhesive, hook-and-loop fastener, or other suitable fastening device. If feasible, a magnetic fastener may be used to attach plate 12 to the rear of mobile device 18. Jack plug 40 is then inserted into sound output portal 42 of mobile device 18, establishing an electrical connection through cables 30, 32 and cable 36 between earpieces 34 and the sound output system embedded in mobile device 18.

The user then attaches assembly 10 to his or her belt, strap, backpack, item of clothing, etc., by pressing on upper portion 44 of attachment clip 20 (FIGS. 1, 2) and moving the bottom of attachment clip 20 away from plate 12. When suitably attached to the apparel or accessory item worn by the user, upper portion 44 of clip 20 is released, and attachment clip 20 holds the plate 12 and mobile device 18 securely to the user's apparel or accessory item. If necessary or desired, the mobile device 18 is activated to be able to receive and/or send electronic impulses that are transformed into sound at earpieces 34.

The user then manually grasps earpieces 34 and applies a tension or pulling force that extracts cables 30, 32 out of reel housing 26 through apertures 28. As cables 30, 32 are extracted from reel housing 26, The spring 118 acting on the cable reel inside reel housing 26 is wound, applying a tension force on the ends of cables 30, 32 extending around the cable reel 116. Upon extracting sufficient cable 30, 32 from reel housing 26 to allow the user to insert one earpiece 34 in each ear, the retraction process is halted, and the automatic reel brake mechanism shown in FIG. 2A, is activated to brake the cables 30, 32 against being retracted back into the housing 26 until the user has completed using mobile device 18.

To retract the cables 30, 32 back into reel housing 26, the user removes the earpieces 34 from the ears, and applies a brief tug or tension force on the cables 30, 32. The spring operated reel 116 inside housing 26 is released as explained above, and the energy stored in the reel spring 118 when the cables 30, 32 were extracted from reel housing 26, rotates the reel and draws cables 30, 32 back onto reel 116 and into housing 26 until each earpiece abuts housing 26 adjacent an aperture 28. It is not necessary to disengage jack plug 40 from portal 42 when the mobile device 18 is no longer being used.

Thus, as seen in FIGS. 1, 2 and 2A, an integral retractable earpiece cable and supporting attachment device 10 is provided in a single unit that attaches to and remains with a mobile communication device. The user need not carry separate headphones or earpieces and separate attachment devices or pouches when transporting and/or using their mobile sound or communication device. The invention described above and shown in FIGS. 1, 2 and 2A provides the user of the mobile device 18 with the convenience of having the earpieces and attachment apparatus for their mobile device as a single unit, thus providing ease of use and aiding in preventing the loss of individual components.

A further embodiment of the present invention is illustrated in FIGS. 3-5. This embodiment allows removal of a front plate assembly of the present invention when the user desires to insert the mobile device 18 into a docking station receptacle. As seen in FIGS. 3 and 5, rear plate 46 forms part of retractable earpiece cable and clip on assembly 10. The rear flat surface 48 of rear plate 46 is attached by adhesive, hook and loop fasteners, or other fastening devices that are known in the art to the rear of mobile device 18. The lateral edges of rear plate 46 are formed into tubular members 50 each defining a hollow channel 52 extending the length of tubular members 50. Each channel 52 is open as shown at 54, such that the portion of rear plate 46 forming tubular members 50 extends approximately 300 to 340 degrees, leaving a longitudinal opening along the vertical length of each channel 52. In the embodiment of FIGS. 3-5, an aperture 56 is located adjacent the lower extent of each tubular member 50.

FIG. 4 illustrates the reel housing 26 attached to or formed with the front side of forward plate 58. A pair of cables 30, 32 extend from reel housing 26 as described above with reference to the embodiment of FIGS. 1, 2 and 2A. Reel housing 26 includes the retractable and extendable cable reel assembly. Earpieces 34 are also connected at one end to cables 30, 32 similar to the embodiment of FIGS. 1 and 2. Also, attachment clip 20 is pivotally attached to forward plate 58.

Each side edge of forward plate 58 includes a tube member 60, 62 having an outer dimension slightly less than the inner diameter of hollow channel 52 of tubular members 50 (FIG. 3). In the illustrated embodiment, tube members 60, 62 are solid, but could be formed in the configuration of hollow tubes if desired. At the lower end of each tube member 60, 62, a spring loaded latch pin 64, 66 is mounted to the tube member for lateral movement toward and away from a respective tube member 60, 62. A spring (not shown) biases each latch pin 64, 66 in an outward direction.

FIG. 5 is a top view of the retractable earpiece cable and attachment clip assembly 10 of the second embodiment of the present invention, showing forward plate 58 slidably and removeably mounted to rear plate 46 (FIG. 3). As seen in FIG. 5, rear plate 46 is attached to mobile device 18 as previously described. Forward plate 58 is assembled on rear plate 46 by sliding tube members 60, 62 along hollow channels 52 of rear plate 46 until latch pins 64, 66 (FIG. 4) extend outward into apertures 56 of tubular members 50 (FIG. 3) and provide a detent locking mechanism to lock forward plate 58 into its proper position adjacent rear plate 46. In this locked position, forward plate 58 extends through openings 54 as illustrated in FIG. 5.

To disengage forward plate 58 from rear plate 46, spring biased latch pins 64, 66 are pushed inward by thumb or finger pressure by the user, until each latch pin 64, 66 has been substantially withdrawn from a corresponding aperture 56. The forward plate 58 is then moved upward to separate the forward plate from rear plate 46. In this configuration, the mobile device 18, with rear plate 46 still attached, can be mounted into a docking station, recharging station, or other device as desired by the user. In an embodiment of the present invention, rear plate 46 is made of a strong but flexible material, allowing tubular members 50 to compress to a somewhat flattened position.

FIGS. 6 and 7 illustrate an embodiment of the retractable earpiece cable and attachment clip assembly 10 of the present invention wherein a flexible member such as a living hinge construction replaces the detent latch mechanism of FIGS. 3 and 4 to lock forward plate 58 to rear plate 46. Referring to FIG. 6, a slot 68 is formed in the walls of each tubular member 50 of the embodiment of rear plate 46 shown in FIG. 3.

FIG. 7 is a detail view illustrating a flexible hinge latching mechanism to removably secure forward plate 58 to rear plate 46. In this embodiment, each tube member 60, 62 extending longitudinally on either side of forward plate 58 includes a flexible arm 70 attached at its upper extent, or preferably formed integral with, tube members 60, 62. A first space 72 lies between flexible arm 70 and a wall portion 74 of each tube member. A second space 76 lies between the bottom of flexible arm 70 and horizontally extending portion 78 of the tube members 60, 62. As seen in FIG. 7, flexible arm 70 is capable of pivotal movement in space 72.

A horizontally extending flange 80 is formed at the bottom of flexible arm 70. Flange 80 includes a flat upper surface 82, a slanted lower surface 84, and a flat frontal surface 86. In its quiescent position shown in FIG. 7, flange 80 extends outward through slot 68 in tubular member 50 such that flat upper surface 82 of flange 80 abuts the upper surface 104 of slot 68, thereby keeping tube members 60, 62, and forward plate 58 from moving upward relative to rear plate 46, as will be explained.

A further embodiment of a latching mechanism to secure the forward plate to the rear plate is illustrated in FIGS. 8-10A-B. Referring to FIG. 8, forward plate 88 is configured similar to flat plate 12 shown in FIGS. 1 and 2, with reel housing 26 formed with or attached to forward plate 88 and cables 30, 32 retractably extending from reel housing 26, and attachment clip 20 also attached to forward plate 88.

In the illustrated embodiment, sets 90 of slots 92 are formed adjacent to each of the four corners of forward plate 88. Slots 92 extend through forward plate 88 and are shown as square or rectangular in shape, but can be any other shape if desired.

FIG. 9 discloses a rear plate 94 that is adapted to be mounted on the rear surface of mobile device 18 (FIG. 1). In this embodiment, rear plate 94 includes four spring-biased moveable latch mechanisms 96 that are dimensionally spaced from the lateral top and bottom edges of rear plate 94 the same as slots 92 are dimensionally spaced from the lateral, top and bottom edges of forward plate 88. As seen in FIGS. 10A and B, each latch mechanism 96 includes a pair of moveable latch members 98 mounted on a slide member 99, wherein each slide member 99 is moveably disposed in a channel or on a rail (not shown) of rear plate 94 such that each latch member is slidable in the same plane as the outer surface of rear plate 94. Each latch member 98 is biased away from its adjacent latch member by a compression spring 100, or any other compression force device as is known in the art. Each latch member 98 also includes a slanted surface 102, and a groove 106 adapted to engage a rim of a slot 92 when forward plate 88 is mounted on rear plate 94, as will be described.

In operation of the embodiment shown in FIGS. 3-5, the rear plate 46 is adhesively or otherwise attached to the back of mobile device 18. The tube members 60, 62 of forward plate 58 are inserted into the top of tubular members 50, and under the force of manual pressure are slid downward in hollow channels 52. When the forward plate 58 reaches the appropriate position, spring loaded latch pins 64, 66 are driven outward into an adjacent aperture 56 in each tubular member 50. This locks forward plate 58 to rear plate 46, and to the rear of mobile device 18. Jack plug 40 (FIG. 4) is then inserted into sound output portal 42 (FIG. 3) of mobile device 18, electrically connecting the sound output system of mobile device 18 to the earpiece cables 30, 32 mounted on reel 116 (FIG. 2A) inside reel housing 26, and to earpieces 34. The user then may attach the assembly 10 and mobile device 18 to an article of clothing or accessory such as a belt, backpack strap, pocket, or the like using attachment clip 20, or place assembly 10 and mobile device 18 into a pocket or handbag, or any other suitable carrying article. To listen to the sound generated by mobile device 18, a slight tension force is manually applied to earpieces 34 to extract cables 30, 32 from reel housing 26 as the cables are unwound from spring-biased reel 116 in reel housing 26. The spring 118 attached to reel 116 is wound, thus storing kinetic energy. When the tension force is removed from cables 30, 32, a slight rearward force on the cables 30, 32 causes reel locking mechanism 124, 128 to lock the cables in place in their extended position as the user inserts the earpieces into his or her ear. The mobile device 18 is then activated to provide sound to the user through the earpieces 34.

When the user is finished listening to the sounds produced by the mobile device 18, the mobile device is switched to its off position, and the earpieces are removed from the user's ears. The user then applies a brief tension pull the cables 30, 32, which releases the reel locking mechanism 124, 128 inside reel housing 26, and the cables 30, 32 are rewound on the reel 116 by the kinetic energy stored in the spring 118. The earpieces 34 are drawn to their storage position against reel housing 26, as seen in FIGS. 4 and 5.

Referring to the embodiment of FIGS. 3-5, if the user desires to place mobile device 18 in a docking station, jack plug 40 is withdrawn from sound output portal 42 of mobile device 18. Thumb and/or finger pressure is then applied to the portions of spring biased latch pins 64, 66, thus disengaging the latch pins from apertures 56, enabling tube members 60, 62 and forward plate 58 to be moved upward in tubular members 50 of rear plate 46. Forward plate 58, along with reel housing 26 and attachment clip 20 is removed from rear plate 46 and stored in a convenient location. Rear plate 46 remains attached to mobile device 18. Tubular members 50 are made of a relatively flexible material, permitting a certain latitude of deformation of the tubular members, if necessary, when mobile device 18 is placed in a docking station.

The embodiment shown in FIGS. 6 and 7 operates with a modified latching mechanism between rear plate 46 and forward plate 58 compared to the spring loaded latch pin mechanisms 64, 66 of FIGS. 3-5. Referring to FIGS. 6 and 7 when tube members 60, 62 of forward plate 58 are inserted into the hollow channels 52 formed by each tubular member 50, the forward plate 58 moves downward with flat frontal surface 86 of each flange 80 slidably engaging the interior surface of a corresponding hollow channel 52, thereby pressuring the lower portion of flexible arm 70 inward into first space 72. As flat upper surface 82 of flange 80 reaches upper surface 104 of slot 68 in tubular member 50, flange 80 and flexible arm 70 are forced outward as flexible arm 70 moves to its unpressured quiescent state. In this position, as shown in FIG. 7, flat upper surface 82 of flange 80 engages upper surface 104 of slot 68, locking tube members 60, 62 and forward plate 58 to rear plate 46 and to mobile device 18. The remainder of the operation of the assembly 10 in its assembled condition is the same as that described in connection with the embodiment of FIGS. 3-5 above.

To disengage forward plate 58 from rear plate 46, thumb or finger pressure is applied to flat frontal surface 86 of each flange 80 located on both tube members 60, 62 until flat upper surface 82 of each flange 80 becomes disengaged from its corresponding surface 104 of slot 68. As flange 80 is moved out of slot 68, flexible arm 70 pivots inwardly into first space 72. An upward force is then applied to forward plate 58 to remove tube members 60, 62 from hollow channels 52 until rear plate 46 and front plate 58 are separated. Front plate 58 is then stored until needed by the user.

The operation of the embodiment of the present invention shown in FIGS. 8-10A-B is next described. As seen in FIG. 9, rear plate 94 is attached to mobile device 18 by means of adhesive, hook-and-loop fasteners, or any other suitable fastening means. Latch members 98 project outwardly away from the surface of rear plate 94. Next, forward plate 88, with reel housing 26, earpieces 34, cables 30, 32 and attachment clip 20, is manually placed over rear plate 94 such that each pair of slots 92 are juxtaposed over a corresponding latch member 98. As forward plate 88 is pushed toward rear plate 94, an edge of each slot 92 contacts a slanted surface 102 of a latch member 98, forcing adjacent latch members to move towards each other against the force of spring 100. When forward plate 88 is in position against rear plate 94, the slots 92 rest adjacent grooves 106 (FIGS. 10A-B) in each latch member 98. Springs 100 then move each slide 99 and latch member 98 outward such that the portions of forward plate 88 adjacent the slots 92 are grasped in corresponding grooves 106, and forward plate 88 is held firmly against rear plate 94.

To disengage forward plate 88 from rear plate 94, manual pressure is applied to each pair of latch members 98, forcing the latch members together against the force of springs 100. This removes the portions of forward plate 88 adjacent slots 92 from engagement with grooves 106, allowing forward plate 88 to be lifted away from rear plate 94. The forward plate 88 is then stored until needed.

Figure 11:
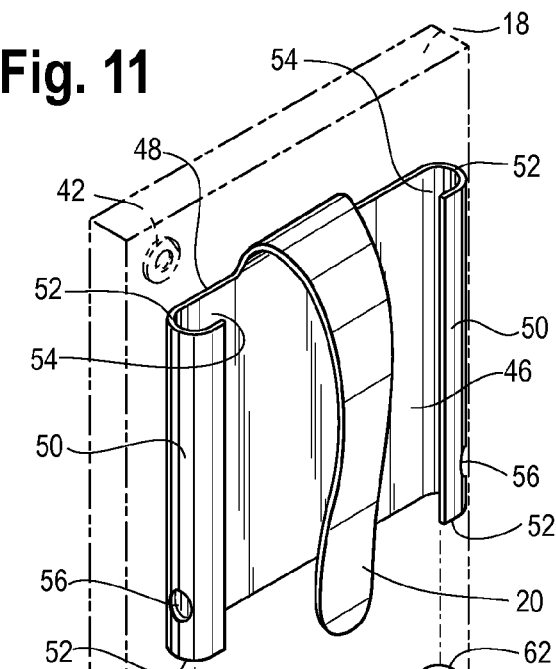
FIG. 11 is a perspective view of the rear plate of a further embodiment of the present invention, where the attachment clip is attached to or formed with the rear plate.
Figure 12:
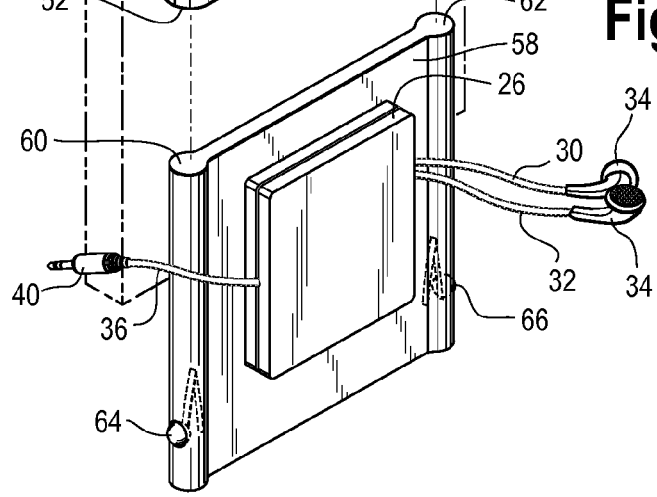
FIG. 12 is a perspective view of the forward plate assembly of the embodiment of the invention shown in FIG. 11, with lines extending between FIGS. 11 and 12 to illustrate how the front plate assembly is attached to the rear plate.
Figure 13:
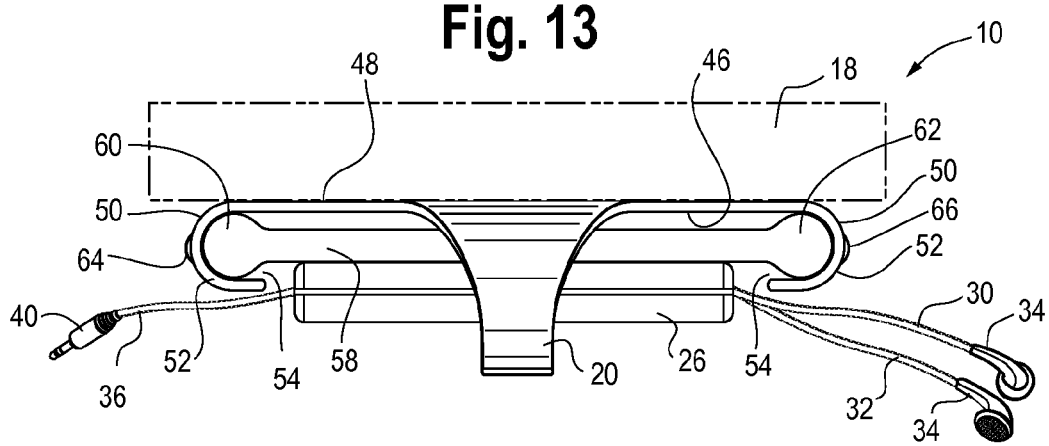
FIG. 13 is a top view of the forward plate assembly of FIG. 12 shown removably attached to the rear plate shown in FIG. 11, with the rear plate shown attached to the mobile sound or communication device.

FIGS. 11, 12 and 13 illustrate a further embodiment of the invention shown in FIGS. 3-7, wherein the attachment clip 20 is flexibly attached directly to rear plate 46 as seen in FIGS. 11 and 13, whereas the attachment clip 20 is attached to forward plate 58 in the embodiment of FIGS. 3-5. Like numerals in FIGS. 11-13 and FIGS. 3-5 are used to identify like elements, and the description of the elements of the embodiment of FIGS. 1-3 above is equally applicable to the embodiment of FIGS. 11-13 with the exception of the location of attachment clip 20.

In operation, the embodiment of FIGS. 11-13 includes rear plate 46 attached, or removably attached, to mobile device 10 as previously described with reference to the embodiment of FIGS. 3-5. In the embodiment of FIGS. 11-13, forward plate 58 (FIGS. 12, 13) is attached to rear plate 46 by inserting tube members 60, 62 of forward plate 58 into the bottom of hollow channels 52 formed in tubular members 50 of rear plate 46. The forward plate is then advanced upward until spring loaded latch pins 64, 66 engage apertures 56 in tubular members 50 to lock forward plate 58 in position relative to rear plate 46 (FIGS. 11-13). In an alternative embodiment where the "living hinge" flange 80 (FIGS. 6, 7) replaces latch pins 64, 66 (FIGS. 3-5), the forward plate 58 is moved upward until flange 80 extends through slot 68, and forward plate 58 is locked in position against rear plate 46. In the embodiment of FIGS. 11-13, forward plate 58 must be attached to rear plate 46 through the bottom of hollow channels 52 since the location of attachment clip 20 in this embodiment prevents the insertion of forward plate 58 and tube members 60, 62 from the top of hollow channels 52.

The foregoing descriptions of the illustrated embodiments of the invention has been presented for purposes of illustration and description, and are not intended to be exhaustive or to limit the invention to the precise forms disclosed. The description was selected to best explain the principles of the invention and practical application of these principals to enable others skilled in the art to best utilize the invention in various embodiments and various modifications as are suited to the particular use contemplated. It is intended that the scope of the invention not be limited by the specification, but be defined by the claims set forth below.

What is claimed is:

1. An extendable and retractable earpiece cable assembly for mobile communication or sound devices, comprising:
   a. an intermediate plate assembly having a first surface, said first surface adapted to be permanently fastened directly to a surface of the mobile device;
   b. said intermediate plate assembly supporting a reel housing, said reel housing disposed on a second surface, opposite and on a parallel plane as said first surface, of the intermediate plate assembly, said reel housing including a reel mechanism around which said earpiece cables are removably wound, said earpiece cables being extendable from and retractable into said reel housing;
   c. said intermediate plate assembly disposed between said mobile communication or sound devices and the reel housing;
   d. each of said earpiece cables having a first end attached to an earpiece; and
   e. each of said earpiece cables having a second end including a connector plug, said connector plug adapted to be electrically connected to said mobile device.

2. The extendable and retractable earpiece cable assembly of claim 1, wherein:
   said reel mechanism permits said earpiece cables to remain in an extendable position relative to the reel housing when said earpieces are in use.

3. The extendable and retractable earpiece cable assembly of claim 2, wherein:
   said reel mechanism retracts said earpiece cables into said reel housing when said earpieces are not in use.

4. An extendable and retractable earpiece cable assembly for mobile communication or sound devices, comprising:
   a. a rear, intermediate plate adapted to be permanently fastened directly to a surface of the mobile device, said rear, intermediate plate including at least one first attachment device;
   b. a forward plate having at least one second attachment device, said at least one second attachment device adapted to slidably and removably engage said at least one first attachment device and removably attach said forward plate to said rear, intermediate plate;
   c. said forward plate supporting a reel housing, said reel housing including a reel mechanism around which said earpiece cables are removably wound, said earpiece cables being extendable from and retractable into said reel housing;
   d. said rear, intermediate plate disposed between said mobile communication or sound devices and the reel housing;
   e. each of said earpiece cables having a first end attached to an earpiece; and
   f. each of said earpiece cables having a second end electrically connected to a connector plug, the connector plug attached to a flexible cable, said connector plug adapted to be electrically connected to said mobile device.

5. An extendable and retractable earpiece cable assembly for mobile communication or sound devices, comprising:
   a. a rear plate adapted to be fastened directly to the mobile device, said rear plate including at least one first attachment device;
   b. a forward plate having at least one second attachment device, said at least one second attachment device adapted to removably engage said at least one first attachment device and removably attach said forward plate to said rear plate;
   c. said forward plate supporting a reel housing, said reel housing including a reel mechanism around which said earpiece cables are removably wound, said earpiece cables being extendable from and retractable into said reel housing;
   d. each of said earpiece cables having a first end attached to an earpiece;
   e. each of said earpiece cables having a second end including a connector plug, each connector plug adapted to be electrically connected to said mobile device;
   f. said at least one first attachment device comprises at least one tubular member having a hollow channel extending through said tubular member; and
   g. said at least one second attachment device comprises at least one tube member, said at least one tube member adapted to be removably inserted into said hollow channel of said at least one first attachment device to connect said forward plate to said rear plate.

6. The extendable and retractable earpiece cable assembly of claim 5, further including:
   a. at least one latching mechanism on said forward plate and at least one corresponding latching device on said rear plate, said latching mechanism and latching device removably connecting said forward plate to said rear plate when said forward plate and said rear plate are attached;
   b. said at least one latching mechanism comprising at least one spring loaded latch pin extending from said at least one tube member;
   c. said at least one latching device comprising at least one tubular member having an aperture extending through said tubular member, said spring loaded latch pin removably extending through said aperture when said forward plate is attached to said rear plate.

7. The extendable and retractable earpiece cable assembly of claim 5, further including:
   a. at least one latching mechanism on said forward plate and at least one corresponding latching device on said rear plate, said latching mechanism and latching device removably connecting said forward plate to said rear plate when said forward plate and said rear plate are attached;
   b. said at least one latching mechanism comprising a flexible arm integral with a corresponding tube member, and a flange radially extending from said flexible arm;
   c. said at least one tubular member having a slot extending therethrough, said radially extending flange extending through said slot and removably connecting said forward plate to said rear plate.

8. An extendable and retractable earpiece cable assembly for mobile communication or sound devices, comprising:
   a. a rear plate adapted to be fastened directly to the mobile device, said rear plate including at least one first attachment device;
   b. a forward plate having at least one second attachment device, said at least one second attachment device adapted to removably engage said at least one first attachment device and removably attach said forward plate to said rear plate;
   c. said forward plate supporting a reel housing, said reel housing including a reel mechanism around which said earpiece cables are removably wound, said earpiece cables being extendable from and retractable into said reel housing;
   d. each of said earpiece cables having a first end attached to an earpiece;
   e. each of said earpiece cables having a second end including a connector plug, each connector plug adapted to be electrically connected to said mobile device; and
   at least one latching mechanism on said forward plate and at least one corresponding latching device on said rear plate, said latching mechanism and latching device removably connecting said forward plate to said rear plate when said forward plate and said rear plate are attached.

9. An extendable and retractable earpiece cable assembly for mobile communication or sound devices, comprising:
   a. a rear plate adapted to be fastened directly to the mobile device, said rear plate including at least one first attachment device;
   b. a forward plate having at least one second attachment device, said at least one second attachment device adapted to removably engage said at least one first attachment device and removably attach said forward plate to said rear plate;
   c. said forward plate supporting a reel housing, said reel housing including a reel mechanism around which said earpiece cables are removably wound, said earpiece cables being extendable from and retractable into said reel housing;
   d. each of said earpiece cables having a first end attached to an earpiece;
   e. each of said earpiece cables having a second end including a connector plug, each connector plug adapted to be electrically connected to said mobile device;
   f. said at least one first attachment device comprises spring biased latch members slidably mounted on said rear plate;

g. said at least one second attachment device comprising at least one slot formed in said forward plate; and h. said at least one latch member engaging a portion of said forward plate adjacent said at least one slot, said at least one latch member fastening said forward plate to said rear plate when said forward plate is placed over said rear plate.

10. The extendable and retractable earpiece cable assembly of claim 9, wherein:

each said at least one first attachment device includes a pair of opposed latch members biased away from each other, each of said opposed latch members having a groove engaging said corresponding portion of said forward plate adjacent said slot when said forward plate is attached to said rear plate.

11. The extendable and retractable earpiece cable assembly of claim 10, wherein:

said at least one first attachment device comprises a plurality of attachment devices, each first attachment device located adjacent a corner of said rear plate; and said at least one slot comprising a plurality of slot pairs, each slot pair located adjacent a corner of said forward plate, each of said slot pairs receiving two opposed latch members when said forward plate is placed over said rear plate.

12. The extendable and retractable earpiece cable assembly of claim 11, wherein, a portion of said forward plate is grasped by a corresponding groove in an adjacent latch member when said forward plate is attached to said rear plate.

* * * * *